United States Patent [19]

Lewis et al.

[11] Patent Number: 4,619,581

[45] Date of Patent: Oct. 28, 1986

[54] SAFETY FUEL DEGRADING

[75] Inventors: Geoffrey A. Lewis, Solihull; Ernest A. Timby, Frimley; Rodney H. Walsh, Hindhead, all of England

[73] Assignee: The Secretary of State for Defence in Her Britannic Majesty's Government of the United Kingdom of Great Britain and Northern Ireland, London, England

[21] Appl. No.: 753,357

[22] Filed: Jul. 9, 1985

Related U.S. Application Data

[63] Continuation of Ser. No. 438,722, Nov. 3, 1982, abandoned.

[30] Foreign Application Priority Data

Nov. 10, 1981 [GB] United Kingdom ................. 8133894

[51] Int. Cl.$^4$ ................................................ F02C 3/20

[52] U.S. Cl. .................................... 415/143; 415/206

[58] Field of Search .................. 415/50, 71, 143, 215, 415/206, 219 R, DIG. 4, 207, 90; 60/39.461, 39.464; 44/52; 366/99, 307, 438, 722

[56] References Cited

U.S. PATENT DOCUMENTS

| | | | |
|---|---|---|---|
| 3,157,793 | 11/1964 | Adkins | 415/90 UX |
| 4,238,926 | 12/1980 | Timby et al. | 60/39.461 |
| 4,261,175 | 4/1981 | Timby et al. | 60/39.464 X |
| 4,421,413 | 12/1983 | Sekiguchi | 366/307 |

*Primary Examiner*—Robert E. Garrett
*Assistant Examiner*—Joseph M. Pitko
*Attorney, Agent, or Firm*—Cushman, Darby & Cushman

[57] ABSTRACT

A device for degrading and pumping anti-misting kerosene has a centrifugal pump leading to a mill including interfitting cylinders with opposing coaxially aligned grooves.

3 Claims, 2 Drawing Figures

SAFETY FUEL DEGRADING

This is a continuation of application Ser. No. 438,722, filed Nov. 3, 1982, which was abandoned upon the filing hereof.

BACKGROUND OF THE INVENTION

1. Field of the Invention

This invention relates to a device for degrading those fuels, commonly referred to as safety fuels, which include an anti-mist additive of a high molecular weight polymer, and in particular for devices for degrading anti-mist kerosene (AMK). Such fuels have been developed for use in aircraft but will not readily pass through the filters or other small orifices which form part of a fuel metering system for an aircraft engine. Thus, it is necessary to reduce the molecular weight of the polymer in the fuel before supplying it to a metering system. This process is generally referred to as degrading the fuel.

2. Brief Description of the Prior Art

UK Patent Specification No. 1,259,113 indicates that when AMK reaches a location in a fuel system where the risk of its dissemination as a mist is no longer a hazard, the molecules of the polymer additive may readily be reduced in molecular weight by a suitable degradation process, for example by mechanical shearing. It has now been discovered that degradation can be effected by subjecting the AMK to various mechanical forces, tensile forces being at least as effective as shear forces. Aircraft fuel systems moreover commonly include a first stage, lower pressure pump, by means of which fuel is delivered to a second stage, high pressure pump.

SUMMARY OF THE INVENTION

It is an object of the present invention to provide an AMK degrading device which also acts as a fuel pump.

According to the invention, a degrading device for safety fuel comprises a housing having a generally cylindrical bore and an inlet and an outlet communicating with respective ends of said bore, and a rotor within said housing, said rotor including a centrifugal pump portion for urging fuel from said inlet towards said bore and a generally cylindrical portion whose periphery lies closely adjacent the radially innermost surface of the wall of said bore, said cylindrical portion and said bore being provided with continuous substantially parallel grooves extending along the length of said bore from said centrifugal pump portion in the direction of said outlet.

In a preferred embodiment the length of said grooves are inversely proportional to the kinetic head of the pump and to the speed of the rotor.

According to another aspect of the invention, a method of degrading a safety fuel comprises raising the fuel to a predetermined pressure, and passing the pressurised fuel through a device including a housing having a generally cylindrical bore and a generally cylindrical rotor therein, the periphery of said rotor lying closely adjacent an innermost surface of said bore, said rotor periphery and said surface having axially extending grooves, the product of the length of said grooves, their number and the angular velocity of said rotor being such that each part of the fuel is transferred between the grooves in the rotor and the housing by a number of times which is at least equal to the value 4150N/cm$^2$ divided by said predetermined pressure.

BRIEF DESCRIPTION OF THE DRAWINGS

An embodiment of the invention will now be described by way of example only, and with reference to the accompanying drawings in which.

DETAILED DESCRIPTION OF THE PREFERRED EMBODIMENT

Figure 1:
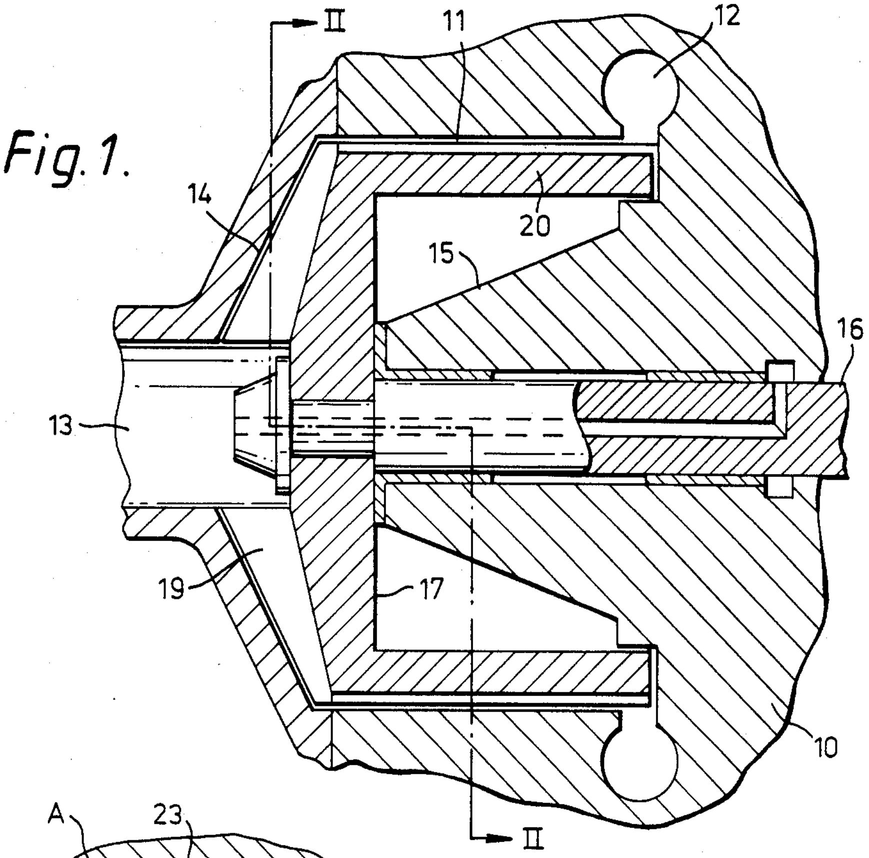
FIG. 1 is a longitudinal section through a device for degrading safety fuel.

The device has a housing 10 in which there is a generally cylindrical bore 11. A volute chamber 12 communicates with one end of the bore 11 and provides an outlet for the device. An inlet passage 13 is axially aligned with the bore 11 and communicates by way of a divergent opening 14 with an end of the bore 11 remote from the volute chamber 12.

The housing 10 has a projection 15 within the bore 11 and this projection 15 supports a drive shaft 16 for a rotor 17. The rotor 17 has a centrifugal pump portion 18 which lies within the divergent opening 14 and comprises a plurality of arcuate blades 19. The rotor 17 also includes a generally cylindrical portion 20 whose periphery 21 lies closely adjacent the radially innermost surfaces of the bore 11. The periphery 21 and the bore 11 are provided with respective sets 22, 23 of grooves which extend parallel to the axis of the rotor 17, from adjacent the centrifugal pump portion 18 to adjacent the volute chamber 12. In the particular example there are 60 such grooves in the surface of the bore 11 and 61 such grooves in the rotor periphery 21.

In use, the device is connected so as to draw AMK fuel from a reservoir through the inlet 13 and to deliver it in a degraded condition and at a relatively low pressure through the volute chamber 12 to the inlet of a high pressure pump which forms part of a fuel system for an aircraft engine.

It has been determined empirically that AMK is adequately degraded as a result of being passed through one or more small orifices so as to experience a total pressure change of 4150N/cm$^2$, the mechanism of degrading being provided by shearing of fuel during its passage through the orifices. The foregoing pressure change Pc provides an indication of the work that is required to degrade a given quantity of AMK.

A centrifugal pump imparts both a pressure head and a kinetic head to a fluid upon which it acts. In a centrifugal pump having arcuate blades 19, the ratio of the kinetic head to the static pressure head falls as pump speed and delivery pressure increase. With a relatively low pressure pump of the kind described in the present example, it is envisaged that the kinetic head will be substantially equal to the static head, or be a large fraction thereof. In a conventional centrifugal pump having a volute chamber outlet, only a small proportion of the kinetic head is recovered. In the present device the kinetic head is repeatedly used to effect shearing of the fuel as it passes from the grooves 22 to the grooves 23, and vice versa, in its passage from the centrifugal pump 18 to the volute chamber 12.

Figure 2:
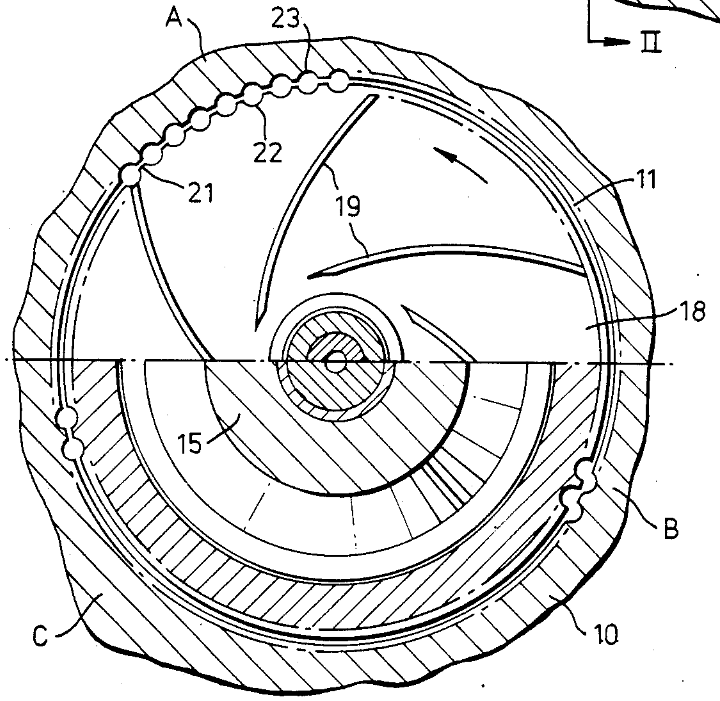
FIG. 2 is a view generally on line 2—2 in FIG. 1.

In the specific example the centrifugal pump portion 18 raises the static pressure of the AMK by 31N/cm$^2$, this value being equal to the kinetic head Pk at the rotor periphery. If fuel moving within the rotating grooves 22 is transferred to the stationary grooves 23 and subsequently back to the grooves 22, it experiences on each occasion an energy change which is equal to a proportion of the kinetic head Pk of $31N/cm^2$. Each of these transfers will be accompanied by shearing of the fuel as a result of the grooves 22, 23 moving from the alignment indicated at A in FIG. 2 to that indicated at B, and subsequently to that indicated at C. The total number of such transfers and shearing actions required to be carried out on a unit of the fuel in order to degrade it completely as it passes through the device is given by:

$$\text{Number of transfers } Nt = k.Pc/Pk \quad (1)$$

where Pc is the total pressure change of $4150N/cm^2$ required to degrade the fuel,
Pk is the kinetic head of the pump 18 and
k is a factor indicative of the fraction of fuel in a groove which is transferred and sheared on each occasion.

In the specific example with the kinetic head Pk of the pump 18 equals to $31N/cm^2$, Nt=130k.

The axial velocity V of the fuel between the pump 18 and the volute chamber 12 is given by:

$$V = Q/A.Ng \quad (2)$$

where Q is the total volume flow of fuel, A is combined area of one each of the grooves 22, 23, and Ng is the number of such combined areas.

In the specific example the volume flow Q is required to be 2.27 liters/second, the combined area A of one each of the grooves 22, 23 is 20 square millimeters, and there are 60 such combined areas. The total flow area of the grooves is thus 12 $cm^2$, and the resultant axial velocity V is therefore 189 cm/second.

The rate of the transfer and shearing operations is the product of the rotational speed per second R of the rotor 17 and the number Ng of the combined channel areas. In the present example the speed of the rotor is 5000 revolutions/minute, whereby:

$$R.Ng = 5000/\text{second} \quad (3)$$

From (1), (2) and (3) the lengths L of the channels 22, 23 are given by:

$$L = Nt.V/R.Ng$$

and in the present example $L = k \times 4.91$ cm.

Tests carried out on apparatus according to the invention indicate that the value of k is approximately 4.

We claim:

1. A single combined device for concurrently pumping and degrading an anti-mist component in a safety fuel, said device comprising:

a housing having a generally cylindrical bore, an inlet and an outlet communicating with respective ends of said bore, and a rotor mounted for rotational movement in said bore within said housing, said rotor including (a) centrifugal pump means having plural radially extending vanes arranged substantially perpendicular to said inlet for low pressure pumping of the safety fuel from said inlet towards said bore and (b) a generally cylindrical fuel-degrading portion arranged substantially perpendicular to and downstream of said centrifugal pump means, said fuel-degrading portion having a periphery disposed closely adjacent the radially innermost surface of the wall of said bore, said cylindrical fuel-degrading portion and said bore each including means for defining continuous substantially parallel opposing sets of relatively small sized grooves extending along the length of said bore and said periphery of said cylindrical fuel-degrading portion from said integral centrifugal pump means to said outlet to thereby establish a narrow fuel-degrading path, wherein said centrifugal pump means, upon rotational movement of said rotor, urges fuel to flow through said grooves to said outlet, and wherein said groove-defining means degrades the fuel flowing therethrough by virtue of relative movement between said opposing sets of grooves as the fuel flows along said fuel-degrading path so that said anti-mist component in said safety fuel is degraded upon reaching said outlet.

2. A method of simultaneously pumping and degrading a safety fuel of the type having an anti-mist component therein, said method comprising the steps of:

(1) raising the fuel to a predetermined pressure in a centralized pump element integrally included in a cylindrical rotor mounted for rotational movement within a bore defined in a housing;

(2) passing the thus pressurized fuel through a degrading device also integrally included in said cylindrical rotor within said housing, the periphery of said rotor lying closely adjacent an innermost surface of said bore, said rotor periphery and said surface having axially extending grooves of relatively small size; and (3) alternately transferring the pressurized fuel, by rotating said rotor, between the small grooves defined in the rotor and the small grooves defined in the innermost surface of the housing, thereby degrading the anti-mist component, the product of the length of said small grooves, their number and the angular velocity of said rotor being such that each part of the fuel is transferred between the small grooves in the rotor and the housing by a number of times which is at least equal to the value $4150N/cm^2$ divided by said predetermined pressure.

3. A device for pumping a fuel and concurrently degrading an anti-mist component in the fuel, said device comprising:

housing means defining a central opening for the intake of fuel, an outlet for the discharge of fuel and a generally cylindrical bore establishing fluid communication between said opening and said outlet;

a rotor mounted for rotational movement about a central axis within said housing and including an integral centrifugal pump means having radially extending blades for low pressure pumping of the fuel from the central opening to said outlet; and degrading means arranged substantially perpendicular to the radially extending blades of said rotor and operatively disposed within said cylindrical bore downstream of said centrifugal pump means, whereby said degrading means degrades the anti-mist component of the fuel prior to discharge of the fuel through said outlet, said degrading means including:

(a) a cylindrical body portion having a periphery in closely-spaced relationship to said defined cylindrical bore, (b) a first set of relatively small elongate grooves formed in said cylindrical bore and extending parallel to said central axis, and (c) a second set of relatively small elongate grooves formed in said cylindrical body portion and also extending parallel to said central axis such that said second set of grooves is rotatably moved integrally with said rotor to effect continually alignment and misalignment of said second set of grooves relative to predetermined ones of said first set of grooves, wherein said degrading means, by virtue of said continual alignment and misalignment of said first and second sets of grooves, effects transfer of said fuel in a narrow fuel-degrading path between said first and second sets of small grooves to responsively cause a shearing of the fuel to thereby degrade the anti-mist component therein.

* * * * *